United States Patent
Redcay

[11] 3,902,173
[45] Aug. 26, 1975

[54] DISTANCE RESPONSIVE CIRCUIT
[75] Inventor: Paul Wilson Redcay, Washington, D.C.
[73] Assignee: The United States of America as represented by the Secretary of the Army, Washington, D.C.
[22] Filed: Jan. 22, 1957
[21] Appl. No.: 635,550

[52] U.S. Cl. ............................. 343/7 PF; 102/70.2 P
[51] Int. Cl. ........................ F42c 13/04; G01s 9/04
[58] Field of Search ................ 343/7, 12, 13, 7 PF; 250/36.18, 20.26; 324/258; 102/70.2 P

[56] References Cited
UNITED STATES PATENTS
2,535,401  12/1950  Emerson ...................... 250/20.26
FOREIGN PATENTS OR APPLICATIONS
585,791  2/1947  United Kingdom .................. 343/7

Primary Examiner—Malcolm F. Hubler
Attorney, Agent, or Firm—Nathan Edelberg; Robert P. Gibson; Saul Elbaum

EXEMPLARY CLAIM

1. A proximity fuze, comprising a combination: an electron tube having at least an anode, a cathode, and a control grid; a resonant circuit connected to said electron tube elements to cause oscillations to be produced, variations in the loading of said resonant circuit varying the amplitude of said oscillations; a capacitor connected so that said capacitor is charged by grid rectification of said oscillations to a negative potential at a rate dependent upon the amplitude of said oscillations, said negative potential being applied to the grid of said electron tube to cause the blocking of said oscillations when the negative potential on said grid reaches a predetermined potential; a resistor effectively in parallel with said capacitor, said resistor having a resistance which allows said capacitor to charge to said predetermined potential, said resistor discharging said capacitor when said oscillations are blocked, the potential on said capacitor reducing from said predetermined potential to a potential where said oscillations are revived and the cycle repeated, said cycle repeating periodically so that the oscillations of said oscillator are periodically blocked, the pulses produced by the periodic blocking of the oscillations of said oscillator having a pulse repetition rate and pulse width which are functions of the amplitude of said oscillations; an antenna connected to said resonant circuit so that a change in the radiation resistance of said antenna varies the loading of said resonant circuit, said radiation resistance changing in response to target proximity; and means for employing the variations in the pulse repetition rate and the pulse width of said pulses to function said proximity fuze at a predetermined distance from a target, said last mentioned means comprising rectifier and filter means for converting said pulses into direct current pulses, means for limiting the amplitude of said direct current pulses, detection means for obtaining from the limited direct current pulses a signal having an amplitude which is a function of the pulse repetition rate and pulse width of said clipped direct current pulses, and means for utilizing said signal to fire said proximity fuze at a predetermined distance from a target.

1 Claim, 2 Drawing Figures

PATENTED AUG 26 1975

3,902,173

INVENTOR.
Paul Wilson Redcay
BY
W. E. Thibodeau, A. W. Breiner & J. D. Edgerton
Attorneys.

DISTANCE RESPONSIVE CIRCUIT

The invention described herein may be manufactured and used by or for the Government for governmental purposes without the payment to me of any royalty thereon.

The invention relates generally to distance responsive devices and more particularly to means for providing pulses responsive to target proximity.

One object of the present invention is to provide means for producing intermittent pulses of electrical energy having a pulse repetition rate or pulse width or both which are responsive to the distance of an antenna from an object.

Another object of this invention is to provide an ordinance proximity fuze which utilizes the variations in pulse repetition rate or pulse width or both to function the proximity fuze at a predetermined distance from a target.

The invention may be briefly summarized as comprising a self-pulsing oscillator circuit having a pulse repetition rate of pulse width or both which are functions of the amplitude of the pulses, and an antenna connected to the self-pulsing oscillator circuit so that a change in its radiation resistance varies the amplitude of the oscillation produced by the oscillator, the radiation resistance changing in response to the distance of the antenna from an object. The combination of the above blocking self-pulsing oscillator and antenna therefore produces pulses of oscillations having a repetition rate or pulse width or both which are functions of the distance of the antenna from an object. These pulses may be incorporated with circuitry, which is well known to those skilled in the art, to provide a proximity fuze.

The specific nature of the invention as well as other objects, uses and advantages thereof will clearly appear from the following description and from the accompanying drawing, in which.

Figure 1:
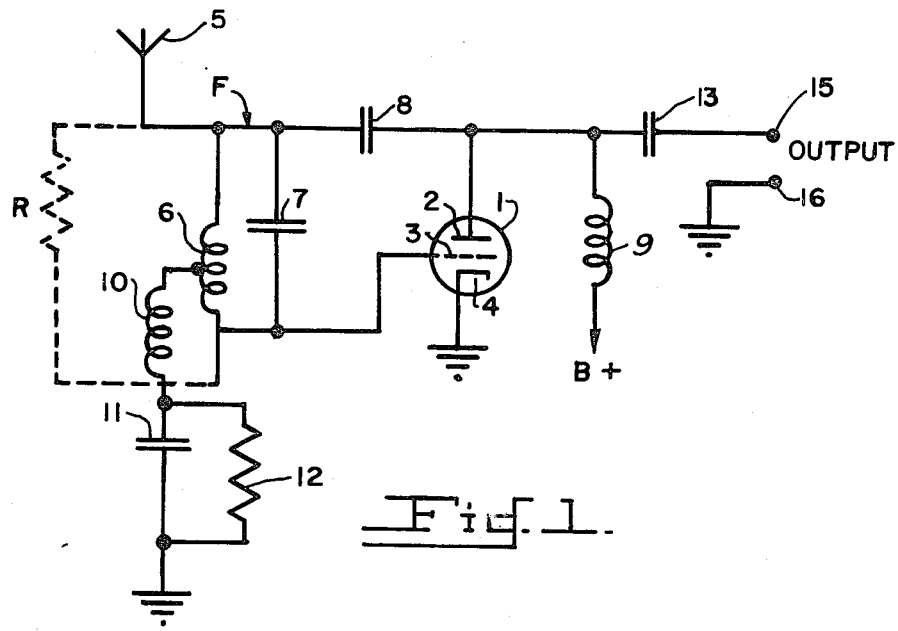
FIG. 1 is a circuit diagram of a self-pulsing oscillator circuit and an antenna, in accordance with the invention.

In FIG. 1 a resonant circuit F, comprising a capacitor 7 and a coil 6 in parallel, is connected to an electron tube 1 to cause oscillations to be produced, one end of the resonant circuit F being connected through a blocking capacitor 8 to the plate 2 of the electron tube 1, and the other end of the resonant circuit F being connected to the grid 3 of the electron tube 1, the cathode 4 of the electron tube 1 being grounded. Direct current power for the electron tube 1, is supplied through a choke 9 having a high impedance at the oscillation frequency.

The parallel combination of a capacitor 11 and a resistor 12 is connected between ground and a point on coil 6 through inductor 10, inductor 10 acting as a choke at the oscillation frequency. The parallel combination of the capacitor 11 and resistor 12 acts as a grid-leak-and-capacitor combination commonly used to develop bias in oscillators, the values of the capacitor 11 and resistor 12 being chosen in this invention to cause the oscillations to be periodically blocked resulting in the production of periodic pulses of oscillations at the output terminals 15 and 16, the output being obtained at the plate 2 of the electron tube 1 through coupling capacitor 13. The pulse repetition rate and pulse width of these pulses are functions of the amplitude of the oscillations because the capacitor 11 is charged by grid rectification at a rate dependent upon the amplitude of these oscillations.

An antenna 5, having a radiation resistance R, which changes in response to the distance of the antenna 5 from an object, is connected to the resonant circuit F so that the radiation resistance R appears in parallel with the resonant circuit F.

The circuit of FIG. 1 operates as follows: a change in the distance of the antenna 5 from an object changes the magnitude of the radiation resistance producing a variation in the loading of the resonant circuit F and thereby causing a variation in the amplitude of the oscillations produced by the oscillator made up of the electron tube 1 and the resonant circuit F. A variation in the amplitude of the oscillations results in a change in the pulse repetition rate and pulse width of the periodic pulses of oscillations obtained at the output terminals. A change in the distance of the antenna 5 from an object thus causes a change in the pulse repetition rate and pulse width of the pulses appearing at the output terminals 15, 16.

Figure 2:
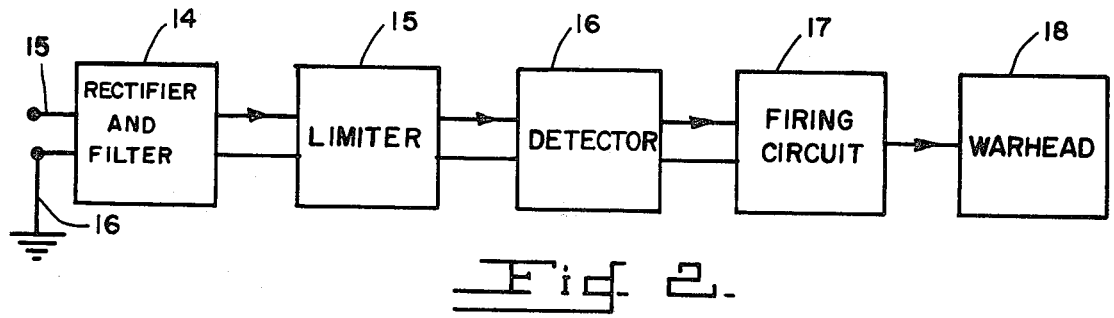
FIG. 2 is a block diagram of circuitry which may be connected to the output terminals 15, 16 of FIG. 1 to provide an ordinance proximity fuze.

FIG. 2 is a block diagram of circuitry which may be connected to the output terminals 15, 16 of FIG. 1 to provide a proximity fuze. The circuit of FIG. 1 produces pulses having a pulse repetition rate and pulse width which are functions of the distance of the antenna from an object. These pulses of oscillations are converted into direct current pulses by rectifier and filter means 14 and limited in amplitude by a limiter 15 to condition the pulses for detection by a suitable detector 16 responsive to variations in pulse repetition rate or pulse width or both; the detected information is applied to a firing circuit 17 to function warhead 18 at a predetermined distance from a target.

It will be apparent that the embodiments shown are only exemplary and that various modifications can be made in construction and arrangement within the scope of the invention as defined in the appended claims.

I claim:

1. A proximity fuze, comprising in combination: an electron tube having at least an anode, a cathode, and a control grid; a resonant circuit connected to said electron tube elements to cause oscillations to be produced, variations in the loading of said resonant circuit varying the amplitude of said oscillations; a capacitor connected so that said capacitor is charged by grid rectification of said oscillations to a negative potential at a rate dependent upon the amplitude of said oscillations, said negative potential being applied to the grid of said electron tube to cause the blocking of said oscillations when the negative potential on said grid reaches a predetermined potential; a resistor effectively in parallel with said capacitor, said resistor having a resistance which allows said capacitor to charge to said predetermined potential, said resistor discharging said capacitor when said oscillations are blocked, the potential on said capacitor reducing from said predetermined potential to a potential where said oscillations are received and the cycle repeated, said cycle repeating periodically so that the oscillations of said oscillator are periodically blocked, the pulses produced by the periodic blocking of the oscillations of said oscillator having a pulse repetition rate and pulse width which are functions of the amplitude of said oscillations; an antenna connected to said resonant circuit so that a change in the radiation resistance of said antenna varies the loading of said resonant circuit, said radiation resistance changing in response to target proximity; and means for employing the variations in the pulse repetition rate and the pulse width of said pulses to function said proximity fuze at a predetermined distance from a target, said last mentioned means comprising rectifier and filter means for converting said pulses into direct current pulses, means for limiting the amplitude of said direct current pulses, detection means for obtaining from the limited direct current pulses a signal having an amplitude which is a function of the pulse repetition rate and pulse width of said clipped direct current pulses, and means for utilizing said signal to fire said proximity fuze at a predetermined distance from a target.

* * * * *